May 10, 1938. D. C. WRIGHT Re. 20,724
CONTROLLER FOR INDUCTIVE DEVICES
Original Filed May 19, 1931
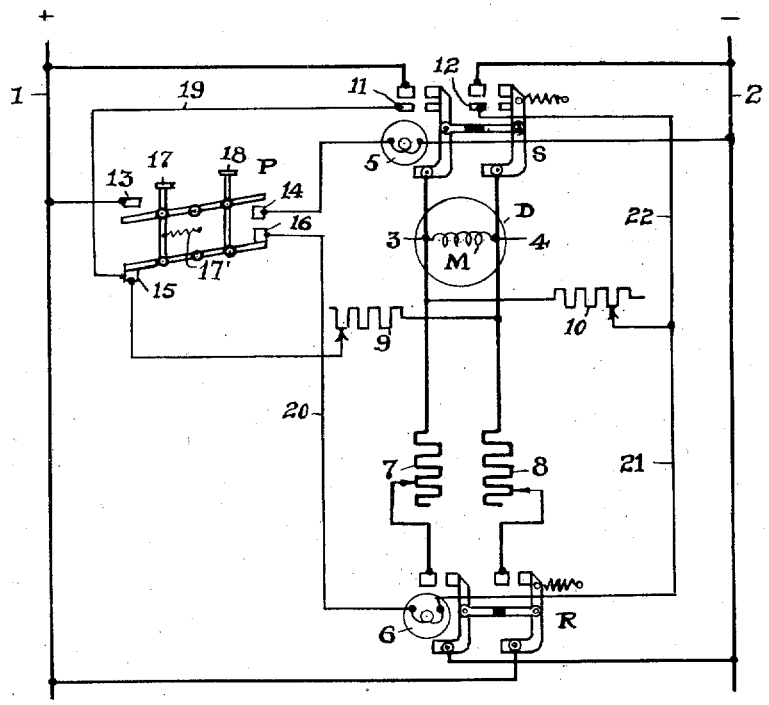
INVENTOR
D. C. Wright
by F. N. Barber
attorney Reissued May 10, 1938

Re. 20,724

UNITED STATES PATENT OFFICE 20,724

CONTROLLER FOR INDUCTIVE DEVICES

David C. Wright, Euclid, Ohio, assignor to The Electric Controller & Manufacturing Company, Cleveland, Ohio, a corporation of Ohio Original No. 2,020,670, dated November 12, 1935, Serial No. 538,472, May 19, 1931. Application for reissue November 11, 1937, Serial No. 174,077

22 Claims. (Cl. 175—335)

My invention relates to the control of inductive devices in which it is desired to reduce the magnetic flux to a minimum when the winding of the device is deenergized or disconnected from the supply line. More particularly, the invention applies to the control of magnetic clutches, motor field and armature windings and the like, and to lifting magnets for handling iron and steel products, such as pig iron, steel ingots, billets, plates, scrap materials and the like.

It is well known that the opening of a circuit of a highly inductive winding creates a discharge voltage at the terminals equal to as high as ten times the applied voltage. This forms a destructive arc on the switch contacts and introduces a high voltage strain on the insulation of the winding and the connections thereto. When the circuit for such a winding is opened the current in the winding reduces to zero almost instantly but the magnetic flux does not reduce to zero and the device energized by the winding is not completely demagnetized.

If a discharge resistance is used across the terminals of the winding, the unsatisfactory results of the high discharge voltage are lessened but the magnetic flux decreases slowly and does not reduce to zero. To reduce the flux quickly, it has been found an advantage to reverse the voltage applied to the winding, thereby allowing the winding to discharge into the supply line, and subsequently to reduce the flux to zero by permitting a limited amount of reverse current to flow, thereby completely demagnetizing the winding. However, as the reverse current continues to flow in the winding, the magnetic flux will be built up in the opposite direction and will attract the armature or load. If it is left to the judgment of the operator to cut off the reverse current, he may cut it off before the magnetic flux has reduced to zero, or he may allow the reverse current to flow long enough for the flux to build up in the opposite direction and re-attract the load.

The principal object of my invention is to demagnetize the device by cutting off the reverse current in the winding automatically when the magnetic flux produced thereby is zero so that the armature or load will be released quickly and completely in the event that the load comprises small particles of magnetic material.

Another object of the present invention is to obtain rapid demagnetization of an inductive device without creating a high discharge voltage by setting up reverse voltage connections before the energizing circuit is interrupted, and thereafter applying reverse voltage until the magnetic flux has been reduced sufficiently for the magnet to release its load.

Further objects of the invention are the reducing of the arcing on the switches or contacts used for energizing and deenergizing the winding, also the saving in electric current and the reduction in the heating of the winding.

A further object of the invention is to make adjustable the value of reverse current allowed to flow in the winding to demagnetize the device to the desired extent for different classes of materials and for various sizes and characteristics of the inductive devices.

For a further understanding of the invention reference is made to the accompanying drawing, the single figure of which is a schematic diagram representing an embodiment of my invention.

Referring to the drawing, the source of supply is indicated at 1 and 2, the inductive device or lifting magnet is shown at D with its energizing winding M, the winding having terminals 3 and 4. The switch for connecting the winding M to the source of supply for energizing it is shown at S, the switch having an operating coil 5 and the control circuit contacts 11 and 12. The switch for reversing the current through the winding M is shown at R with its operating coil 6. The switches or contactors S and R are shown as double-pole contactors, but it will be readily understood that two single-pole contactors can be used for either one, each contactor having an operating coil of its own. To limit the reverse current applied to the winding M, resistors 7 and 8 are used, which may be made adjustable to regulate the value of the reverse current in accordance with the electrical and magnetic characteristics of the device D and the characteristics of the load to be attracted. The resistors 9 and 10 are in the circuit of the operating coil 6 of the contactor R to limit the current in this circuit, and can be made adjustable to regulate the opening of the contactor R, as later described. A push button or master switch is shown at P. This switch is preferably of the snap action type which moves quickly from one position to the other by virtue of a toggle action spring 17' having one end thereof connected to an arm of the button 17, and the other end of which is connected to a stationary point. The arm is movable with the switch P, and the end of the arm to which the spring is so attached, so that when the switch is moved over the dead center position from one position to the other the spring will cause a snap action, thereby insuring quicker movement.

When it is desired to energize the winding M, the button 18 of the master switch P is pressed. This opens contacts 15 and 16 and closes contacts 13 and 14 to energize the operating coil 5 of the contactor S, whereupon the contactor S closes and the winding M is energized to its fullest extent. Current also flows from the positive supply through the auxiliary contact 11, the resistor 9 and through the right hand main contact of the contactor S to the other side of the source of supply. Another circuit is made from the positive side of the line through the left hand main contact of contactor S, through the resistance 10 and through the auxiliary contact 12 to the negative side of the line. The resistors 9 and 10 are of a high value and only a very small current flows in them in comparison with the amount of current taken by the winding M.

When it is desired to demagnetize the device D, push button 17 of the master switch is pressed which opens contacts 13 and 14 and closes contacts 15 and 16. The opening of contacts 13 and 14 deenergizes the operating coil 5, but before the main contacts of the contactor S have had time to open, a circuit is closed through the operating coil 6 of the contactor R from positive lead 1, through the contact 11, the wire 19, the contacts 15 and 16 of the master switch, the wire 20, the operating coil 6, the wires 21 and 22 and the contact 12 to the negative supply lead 2. It is a well known fact that a contactor will close more quickly when its operating winding is energized than it will open when its operating winding is deenergized. Contactor R therefore closes before contactor S opens, thereby providing a discharge circuit for the device D from the terminal 4, through the resistor 8, the right hand contact of contactor R, the supply lead 1, the supply system to lead 2, the left hand contact of contactor R, and the resistor 7 to the terminal 3 of the winding M. Although contacts 11 and 12 are opened an instant later the discharge voltage of the winding M holds the contactor R closed by the circuit from the terminal 4, the resistor 9, the contacts 15 and 16, the wire 20, the operating coil 6, the wire 21 and the resistor 10 to the terminal 3 of the winding M. The discharge voltage of the magnet is now opposed to the supply line voltage and when the discharge voltage, which may be twice or three times as much as the supply voltage at the beginning of the discharge, has reduced to a value equal and opposed to line voltage, then the current in the winding M is zero. Current now begins to flow in the reverse direction through the winding from positive lead 1 through the right hand contact of contactor R, the resistor 8, the winding M, the resistor 7 and the left hand contact of contactor R to the negative supply lead 2. The current now begins to build up in the reverse direction in the magnet and causes the remaining flux to be decreased to a zero value, at which time the discharge voltage will be approximately zero and the operating coil 6 will be sufficiently deenergized to permit the contactor R to open, thereby cutting off the reverse current at the moment the device D is completely demagnetized.

It is apparent from the foregoing description that during the working period of the magnet, the winding is never disconnected entirely from the source of supply but is connected either through switches S or R, or both, so that a discharge circuit through the source of supply is provided at all times.

In commercial lifting magnets of large size, it has been found that the opening of contactor R is approximately 1¼ seconds after the opening of contactor S. The same controller can be used for different sizes of magnets for inductive windings by adjusting the resistors 9 and 10, so that the contactor R drops out at the time the load is released from the magnet, thereby preventing the reverse current building up to such a value that the magnetic flux will be reversed, causing the magnet to re-attract its load. The closing of contactor R before the opening of the contactor S, connects a discharge path for the winding before it is disconnected from the source of supply by the contactor S, thereby reducing the arcing at the main contacts of S to a very small amount. This operation also reduces the discharge voltage on the magnet to about one-third of the value experienced if the contactor S is opened first.

In one installation of this invention with a 230 volt supply line, it was found that as a result of the reversal of the current in the magnet D before the energizing switch S had opened, the discharge voltage of the magnet D reached only about 1100 volts, whereas without this rapid reversal it was observed to reach approximately 3500 volts. With the discharge voltage reduced to 230 volts, the current in the magnetic winding became zero. However, the voltage in the magnet did not reach zero until the reverse current had built up to 8 or 9 amperes, which was the proper value for opening the contactor R to cut off the reverse current. The voltage on the operating coil 6 was at the time the contactor opened about 27 volts which would be about the voltage across the terminals of the magnet winding M at the time the contactor R starts to open, but the time delay of the contactor in opening allowed the magnet voltage to be practically zero when the contactors opened and interrupted the reverse current.

Experiments made with different kinds of magnetic materials indicate that the magnet drops its load quickly and cleanly when the voltage on the magnet is zero, which corresponds to the zero condition of flux in the magnetic circuit of the magnet. This is a desired condition when the magnet is handling small pieces of scrap material. If the magnet is handling heavy ingots, the ingots would drop off due to the weight before the flux reaches zero, so that for commercial purposes it is advisable to adjust the resistors 9 and 10 at arbitrary values to secure clean dropping of the load of any class of materials to be handled. If the same control device is to be used on large and small magnets, it is advisable to change the resistors 9 and 10 to give the best results.

I claim:

1. An apparatus for controlling the operation of a lifting magnet, comprising means for energizing the magnet to lift a load, means operable to render said first mentioned means ineffective and to deenergize the magnet and drop the load, switching means for setting up reverse electromotive-force connections for said magnet before said deenergizing means becomes effective, said switching means being rendered operative to apply reverse electromotive-force to the magnet upon the operation of said second mentioned means, and means controlled by the magnet for opening the switch to cut off the reverse electromotive-force when the magnet is deenergized sufficiently to drop its load.

2. In combination, a lifting magnet, means for energizing the magnet by applying a voltage to the magnet, means for deenergizing the magnet, said deenergizing means comprising a magnetically operated switch to cause the polarity of the voltage applied to the magnet to be reversed and to permit reversal of current in said magnet, manual means for causing said switch to become closed to permit the polarity of the voltage applied to the magnet to be reversed, and means controlled by the magnetic flux in said magnet for causing said magnetically operated switch to remain momentarily closed while said voltage of reverse polarity and said reverse current are effective until magnetic flux has reached a value which will cause the magnet to drop its load.

3. An apparatus for controlling the inductive winding, comprising a switch for admitting an energizing current to the winding to produce a magnetic flux, a second switch for setting up reverse current connections to the winding, and magnetically operated means for causing opening of said first mentioned switch and for causing closing of said second mentioned switch to set up said reverse current connections before opening of said first mentioned switch to interrupt the energizing current, said second switch admitting the reverse current to neutralize the induced flux after said induced flux has decreased a predetermined amount.

4. An apparatus for controlling an inductive winding, comprising a source of current supply, a magnetically-operated switch for admitting current to the winding to energize the same, a second magnetically-operated switch for reversing the applied polarity of said current supply and for admitting reverse current to the winding to neutralize the induced flux therein, a relay circuit for said first mentioned magnetically-operated switch and a relay circuit for said second mentioned magnetically-operated switch, and simultaneously operable means for causing said second mentioned magnetically-operated switch to become closed to set up connections for reversing the applied polarity of said current supply before causing said first mentioned magnetically-operated switch to become open to interrupt the energizing current through said winding, and means operable by the induced flux in said winding for maintaining said second mentioned magnetically-operated switch closed until the flux in said winding has reached a predetermined minimum.

5. The combination with an inductive winding, a source of power, two resistors, a pair of contacts, a circuit connecting the contacts and winding in series to said source, of means for connecting each of said resistors in parallel with the winding, and means for opening said contacts whereby the winding remains connected to said source in series with said resistors so that the flow of current in the winding is reversed.

6. The combination with an inductive winding, a source of power, two resistors, a pair of contacts, a circuit connecting the contacts and winding in series to said source, of means for connecting each of said resistors in parallel with the winding, means for opening said contacts whereby the winding remains connected to said source in series with said resistors so that the flow of current in the winding is reversed, and means controlled by flux produced in the winding for disconnecting the winding from said source.

7. The combination with an inductive winding, a source of power, two resistors, of means for connecting the winding to said source so that the current flows through the winding in a given direction, means for connecting each of said resistors in parallel with the winding while it is still connected to the source, and means for changing said connections whereby the winding is connected in series with the resistors to the source so that current flows through the winding in a direction opposite to said given direction.

8. The combination with an inductive winding, a source of power, current limiting resistance and contacts for connecting the winding to said source, of contacting means for connecting the resistance to the source in series with said contacts, and means whereby the opening of said contacts leaves the winding connected to the source in series with the resistance and with the polarity of the source reversed with respect to the winding.

9. The combination with an inductive winding, a source of power and two resistors, of contacting means for connecting the winding to the said source, means for connecting each of said resistors in parallel with the winding and in series with said contacting means, and means whereby the opening of said contacting means leaves the winding connected to said source in series with each of said resistors.

10. In combination, a source of power, an inductive winding connected to said source at all times during the working period of the winding, means for reversing the current in the winding during said period, and means responsive to the electrical condition of the winding to cut off the reverse current and thereby terminate the working period.

11. In combination, a source of power, an inductive winding connected to said source at all times during the working period of the winding, means for reversing the current in the winding during said period, whereby the normal discharge voltage at the terminals of the winding is reduced, and means controlled by the discharge voltage to discontinue the flow of said reverse current.

12. In combination, a source of supply, a translating device, a resistance, contacting means for connecting said device to the source so that current flows through the device in one direction, contacting means for connecting the device to the source in series with said resistance with the polarity reversed, means for closing the second contacting means while current flows through the device and the first contacting means, and means for opening the first contacting means, leaving the device connected to the source through the second contacting means.

13. In combination, a source of supply, a translating device, resistance, contacting means for connecting said device to the source so that current flows through the device in one direction, contacting means for connecting the device to the source in series with said resistance, with the polarity reversed, means for closing the second contacting means while current flows through the device and the first contacting means, means for opening the first contacting means, leaving the device connected to the source through the second contacting means, and means controlled by the electrical condition of said device for opening the said second contacting means.

14. In combination, a magnet, a winding therefor, a source of power, a circuit for connecting said winding to said source of power, an electro-responsive contactor operable to open and close said circuit, a second circuit for connecting said winding to the source of power to effect reversal of the current flow through the winding, an electro-responsive contactor operable to open and close said second circuit, means for actuating said contactors and being operable to actuate the contactor in the second circuit to close said second circuit before the current in the first circuit is interrupted by the contactor in said circuit.

15. In combination, a magnet, a winding therefor, a source of power, a circuit for connecting said winding to said source of power, an electro-responsive contactor operable to open and close said circuit, a second circuit for connecting said winding to the source of power to effect reversal of the current flow through the winding, an electro-responsive contactor operable to open and close said second circuit, means for actuating said contactors and being operable to actuate the contactor in the second circuit to close said second circuit before the current in the first circuit is interrupted by the contactor in said circuit, said second contactor being responsive to the electrical condition of the winding and being operably responsive to variations in the electrical condition of the winding to interrupt said second circuit.

16. A system for energizing and deenergizing a winding, comprising means operable to close and to open a first circuit for controlling the application of electromotive-force to said winding in a predetermined direction, means operable to complete a second circuit for applying electromotive-force to said winding in a direction opposite to said predetermined direction, said means operating to close said second circuit before said first mentioned means operates to open said first circuit, and means responsive to the electromotive-force across said winding for controlling the duration of application of said electromotive-force in said opposite direction.

17. A system for energizing and deenergizing a winding, comprising means operable to close and to open a first circuit for controlling the application of electromotive-force to said winding in a predetermined direction, means operable to complete a second circuit for applying electromotive-force to said winding in a direction opposite to said predetermined direction, said means operating to close said second circuit before said first mentioned means operates to open said first circuit, and means for automatically controlling the duration of application of said electromotive-force in said opposite direction.

18. A system for energizing and deenergizing a winding, comprising means operable to close and to open a first circuit for controlling the application of electromotive-force to said winding in a predetermined direction, means operable to complete a second circuit for applying electromotive-force to said winding in a direction opposite to said predetermined direction, said means operating to close said second circuit before said first mentioned means operates to open said first circuit, and means, responsive to the electromotive-force across said winding, for maintaining said second circuit closed after said first circuit opens and for automatically controlling the duration of application of said electromotive-force in said opposite direction.

19. A system for energizing and deenergizing a magnet, comprising means operable to close and to open a first circuit for controlling the application of electromotive-force to said magnet in a predetermined direction, means operable to complete a second circuit for applying electromotive-force to said magnet in a direction opposite to said predetermined direction, said means operating to close said second circuit before said first mentioned means operates to open said first crcuit, and means responsive to the electromotive-force across said magnet for controlling the duration of application of said electromotive-force in said opposite direction, to thereby prevent production of magnetic flux by said magnet in a direction reversed to that produced when it is in said first circuit.

20. A system for energizing and deenergizing a winding, comprising means operable to close and to open a first circuit for controlling the application of electromotive-force to said winding in a predetermined direction, and means operable to complete a second circuit for applying electromotive-force to said winding in a direction opposite to said predetermined direction, said means operating to close said second circuit before said first mentioned means operates to open said first circuit.

21. A method of demagnetizing a magnet connected to a source of power, which comprises applying electromotive-force to said magnet in a direction opposed to the electromotive-force applied by said source of power before said magnet is disconnected from said source of power, and then removing said opposed electromotive-force when said magnet is substantially completely demagnetized.

22. A method of demagnetizing a magnet connected to a source of power, which comprises applying electromotive force to said magnet in a direction opposed to the electromotive-force applied by said source of power before said magnet is disconnected from said source of power.

DAVID C. WRIGHT.